Sept. 21, 1965    W. McMURRAY    3,207,974
INVERTER CIRCUITS
Filed Feb. 23, 1961    7 Sheets-Sheet 1

Inventor
William McMurray
by Charles W. Helzer
His Attorney

Inventor
William McMurray
by Charles W Helzer
His Attorney

Sept. 21, 1965    W. McMURRAY    3,207,974
INVERTER CIRCUITS
Filed Feb. 23, 1961    7 Sheets-Sheet 3

Inventor
William McMurray
by Charles W. Helzer
His Attorney

Sept. 21, 1965  W. McMURRAY  3,207,974
INVERTER CIRCUITS
Filed Feb. 23, 1961  7 Sheets-Sheet 4
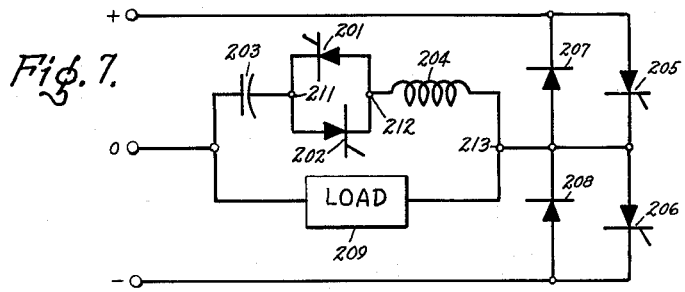
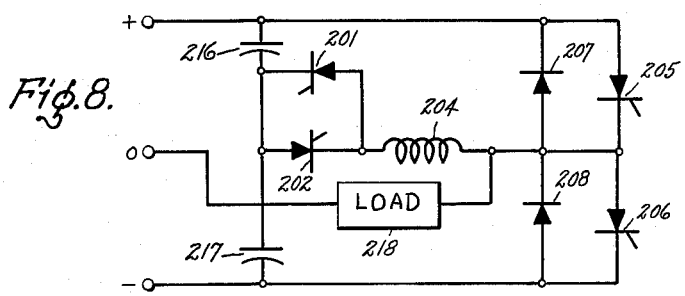
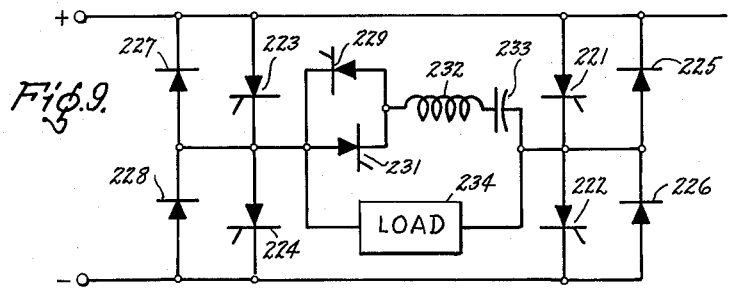
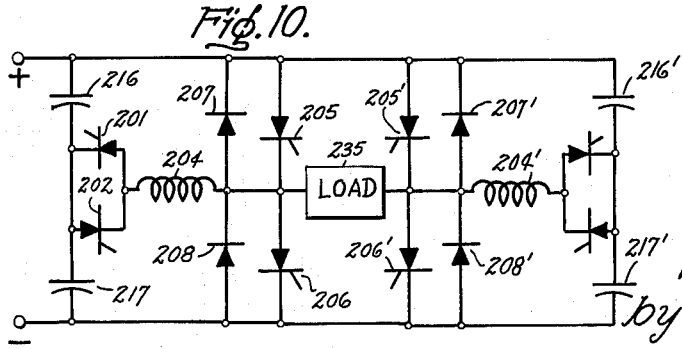
Inventor
William McMurray
by Charles W. Helzer
His Attorney Sept. 21, 1965     W. McMURRAY     3,207,974
INVERTER CIRCUITS
Filed Feb. 23, 1961     7 Sheets-Sheet 5

Inventor
William McMurray
by Charles W. Helzer
His Attorney

Sept. 21, 1965  W. McMURRAY  3,207,974
INVERTER CIRCUITS
Filed Feb. 23, 1961  7 Sheets-Sheet 6
Fig. 13
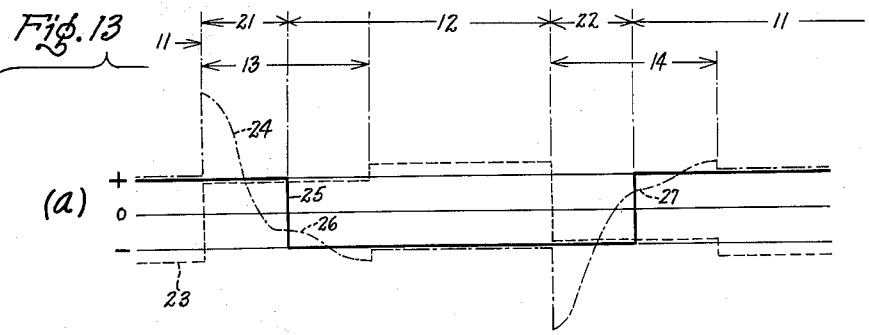
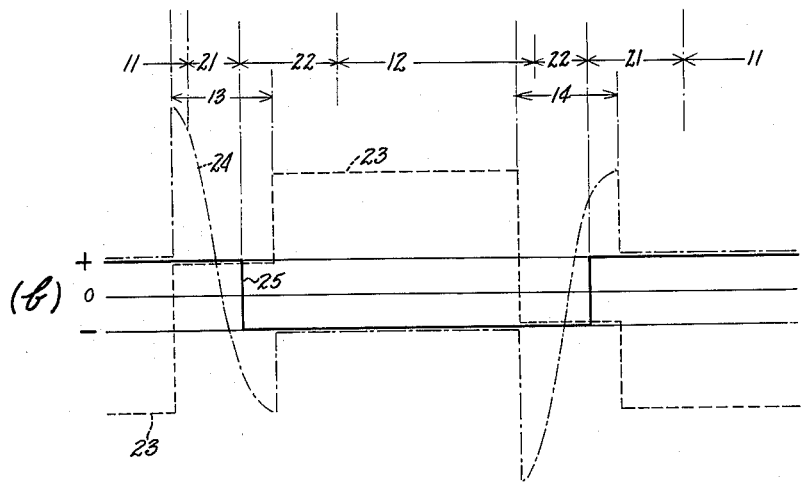
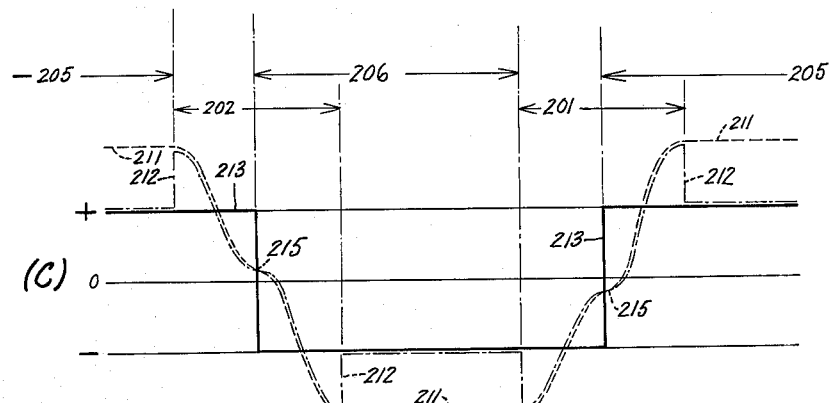
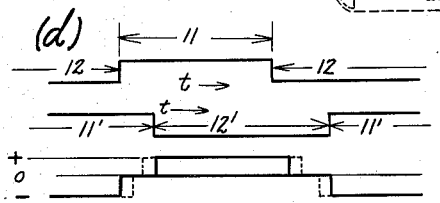
Inventor
William McMurray
by Charles W Helzer
His Attorney

# United States Patent Office 3,207,974
Patented Sept. 21, 1965

3,207,974
INVERTER CIRCUITS
William McMurray, Ballston Lake, N.Y., assignor to General Electric Company, a corporation of New York
Filed Feb. 23, 1961, Ser. No. 91,038
19 Claims. (Cl. 321—45)

The present invention relates to a new and improved inverter circuit for converting direct current electric power into alternating current electric power.

More specifically, the invention relates to new and improved inverter circuits of the type employing gate controlled rectifiers and having a very high efficiency.

There are a number of known inverter circuits available in the art today which employ either electron tubes, gas discharge tubes, or transistor semiconductor devices to achieve conversion of direct current electric power to laternating current electric power. While many of these known circuits are satisfactory for some applications, they do have a number of limitations inherent in their design which render them impractical for use in many situations due to their inefficiency, or their inability to supply a required amount of power at a desired operating frequency, or because of poor regulation, or because of the physical characteristics of the elements out of which they are constructed.

It is, therefore, a primary object of the present invention to provide a family of new and improved inverter circuits which are built from solid state gate controlled rectifiers and hence are capable of operation under the most rugged environmental conditions.

Another object of the invention is to provide new and improved inverter circuits of the above type which are capable of providing any desired power output over a limited but wide range of power levels, and at operating frequencies likewise extending over a wide range of values.

A still further object of the invention is to provide a family of new and improved inverter circuits having the above set forth characteristics which are highly efficient in operation, and possess good regulation.

In practicing the invention, a family of new and improved inverter circuits are provided for use in converting direct current electric power into alternating current power. These inverter circuits employ a new communication scheme which includes an inductor and a capacitor connected in series circuit relationship with an auxiliary turn-off gate controlled rectifier. The inverter circuits using this scheme include at least two load current carrying gate controlled rectifiers for connecting a load device to respective terminals of a direct current supply and at least two commutating gate controlled rectifiers are connected in series circuit relationship with the series connected capacitor and inductor and to respective ones of the load current carrying rectifiers for supplying a reverse polarity potential across the load current carrying rectifiers during commutating intervals.

Other objects, features and many of the attendant advantages of this invention will be appreciated more readily as the same becomes better understood by reference to the following detailed description when considered in connection with the accompanying drawings, wherein like parts in each of the several figures are identified by the same reference character, and wherein:

FIGURE 7 is a schematic circuit diagram of still a different type of single-phase inverter circuit constructed in accordance with the invention which employs a pair of back-to-back reverse polarity connected gate controlled rectifiers;

FIGURE 8 is a schematic circuit diagram of a second form of center-tap direct current supply single-phase inverter circuit constructed along the lines of the circuit shown in FIGURE 7;

FIGURE 9 is a schematic circuit diagram of a bridge type inverter constructed in accordance with the invention which employs the reverse polarity parallel connected gate controlled rectifier;

FIGURE 10 is still another form of bridge type inverter constructed in accordance with the invention;

Figure 1:
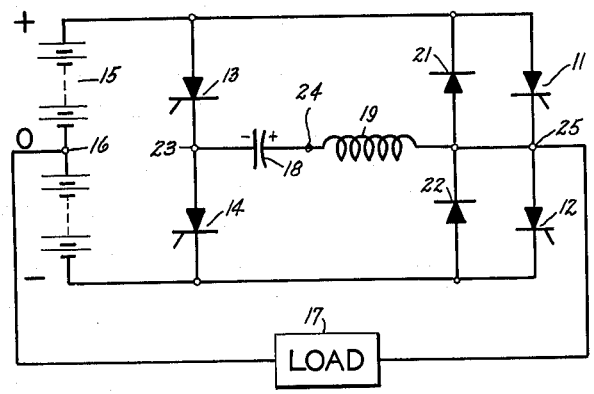
FIGURE 1 is the schematic circuit diagram of a single-phase inverter circuit constructed in accordance with the present invention which employs a center-tap direct current power source.
Figure 2:
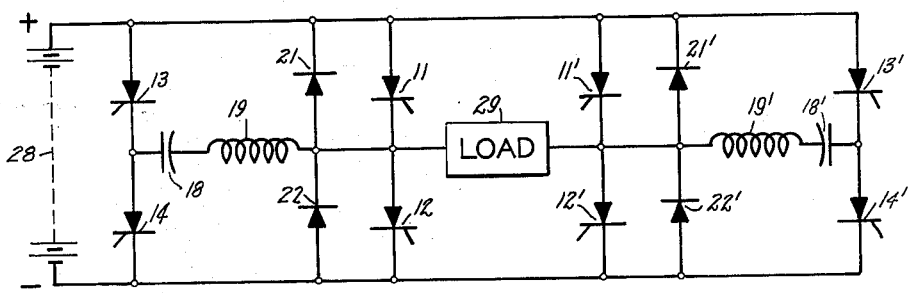
FIGURE 2 is a circuit diagram of a single-phase bridge inverter constructed in accordance with the invention.
Figure 4:
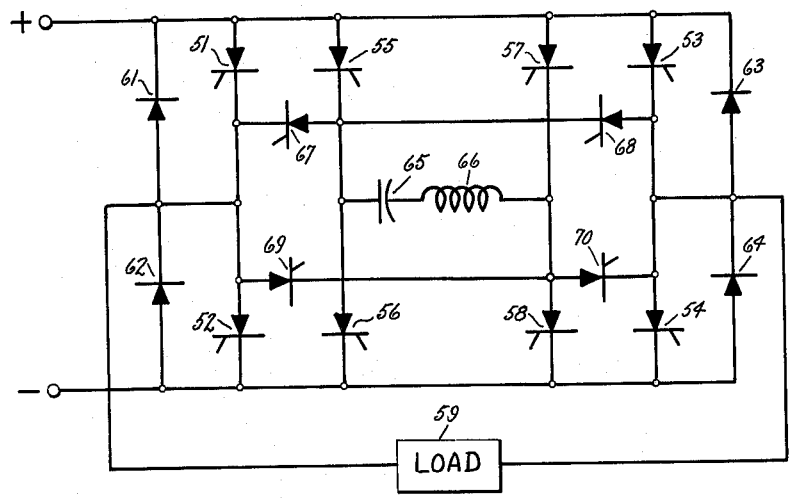
FIGURE 4 is a schematic circuit diagram of an inverter circuit constructed in accordance with the present invention which comprises a bridge employing a common inductor-capacitor in its commutating branch.
Figure 5:
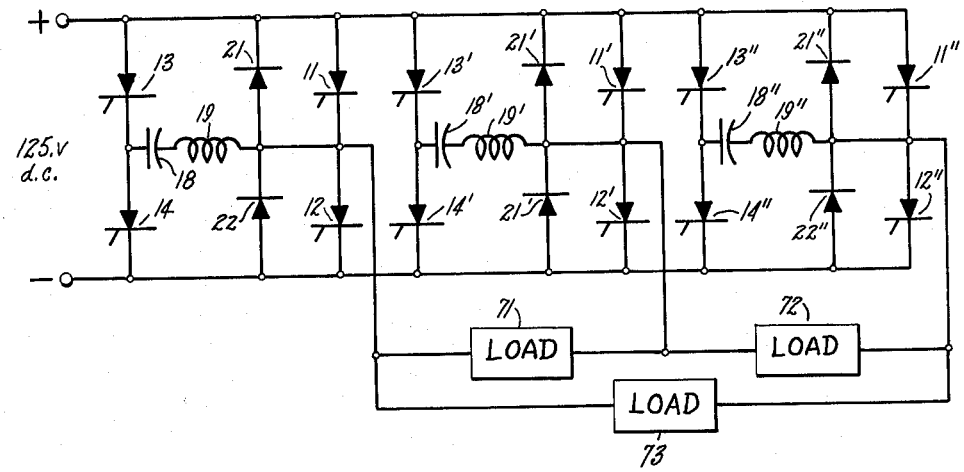
FIGURE 5 is a three-phase bridge inverter circuit constructed in accordance with the invention.
Figure 6:
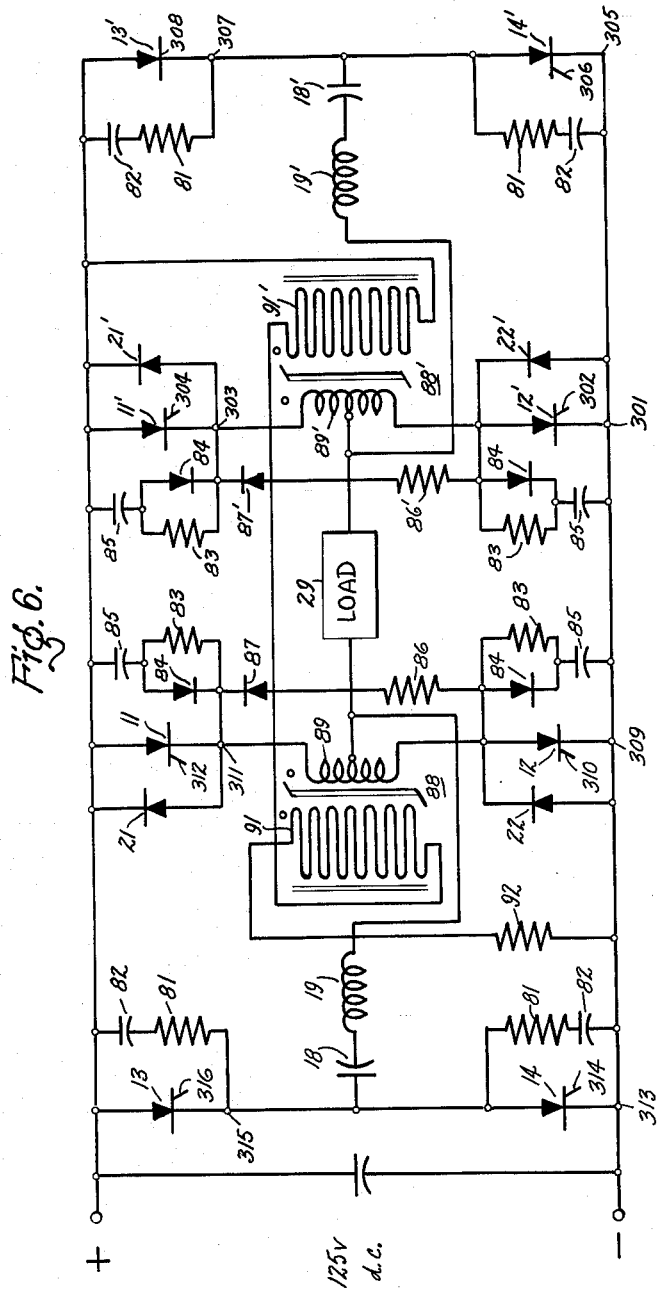
FIGURE 6 is a circuit diagram of a complete single-phase bridge inverter which includes transient suppressing reactors, and resistor-capacitor cushioning networks.
Figure 14:
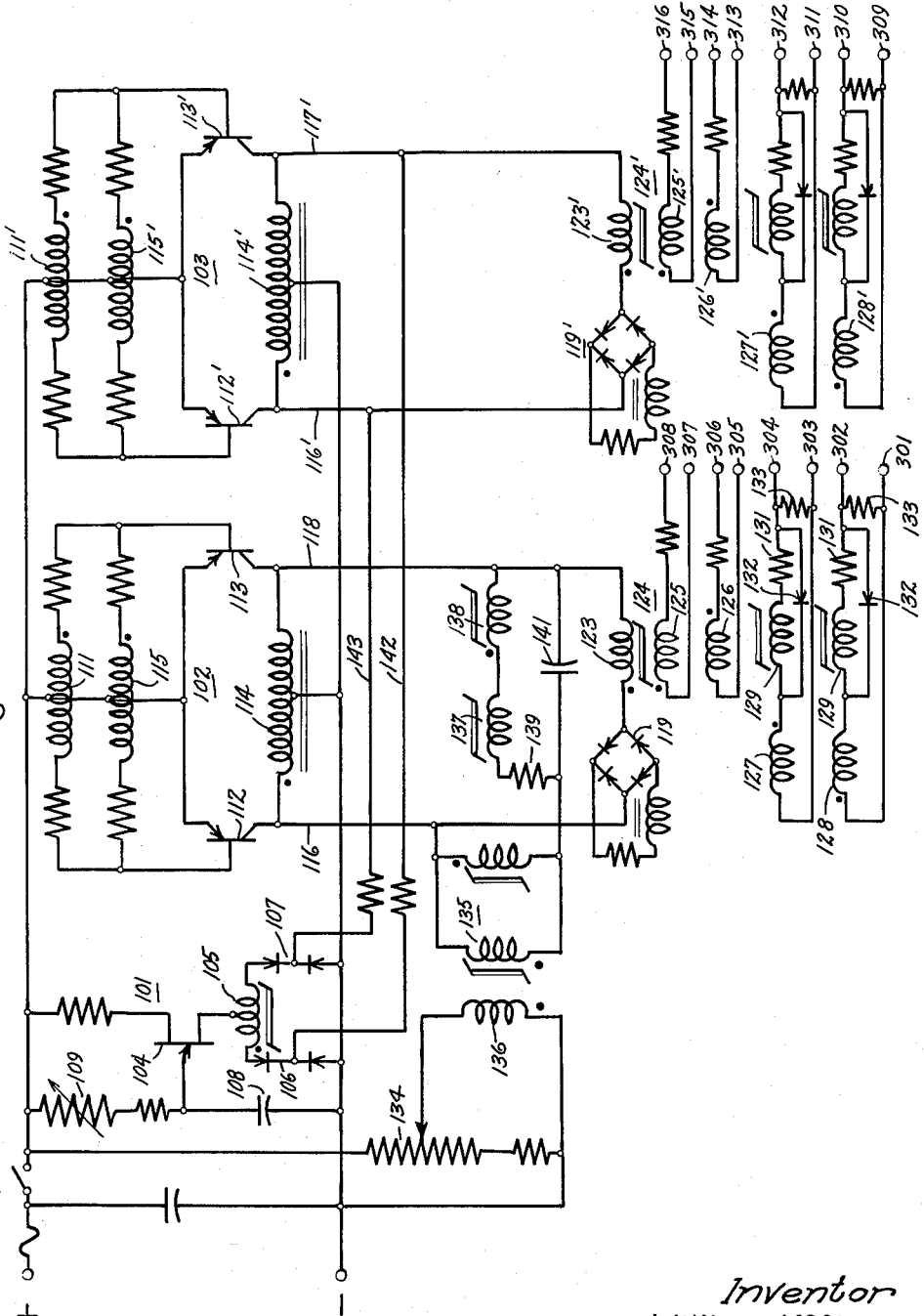

FIGURE 13 is a series of voltage versus time characteristic curves plotted to show the wave shape of the potentials appearing across different points of the respective inverter circuits shown in FIGURES 1 and 7; and FIGURE 14 is a schematic circuit diagram of a gating signal source for use in controlling the operation of any one of the inverter circuits shown in FIGURES 1–12, and particularly for use in controlling the operation of the bridge type inverter circuits illustrated in FIGURE 2, FIGURE 6, and FIGURE 10.

FIGURE 1 on the drawings shows a single-phase inverter circuit in accordance with the invention. The inverter circuit of FIGURE 1 is comprised by two sets of two series connected semiconductor type gate controlled rectifiers 11, 12 and 13, 14 connected across a direct current power supply 15. The gate controlled rectifiers 11 through 14 are essentially PNPN semiconductor devices wherein conduction through the device is initiated by the application of a small gating current to a gating electrode comprising a part of the device. These devices are the solid state counterpart of a gaseous thyratron in that they operate in a manner similar to that of the gas thyratron but they have a much smaller forward drop and the deionization time of the gate controlled rectifier is considerably less. For a more detailed description of the construction and manner of operation of the silicon controlled rectifier, reference is made to a publication entitled, "The General Electric Controlled Rectifier Manual," published by the Semiconductor Products Department, General Electric Company, Syracuse, New York.

The two sets of series connected gate controlled rectifiers 11 through 14 are connected across the direct current power supply 15 which has a center-tap connection 16, and a load device 17 is connected between the center-tap connection of the power supply and the juncture of the two load current carrying gate controlled rectifiers 11 and 12. A commutating circuit comprised by a capacitor 18 and an inductor 19 connected in series circuit relationship, is connected between the juncture of the two gate controlled rectifiers 13, 14 and the juncture of the two gate controlled rectifiers 11, 12. A pair of commutating diodes 21 and 22 are connected across respective ones of the gate controlled rectifiers 11 and 12 in a reverse polarity sense for a purpose to be described more fully hereinafter.

The following values are cited as illustrative only of one particular circuit fabricated in accordance with the invention. The two silicon controlled rectifiers 11 and 12 may comprise Model C–40–B, General Electric silicon controlled rectifiers, and the two gate controlled rectifiers 13 and 14 may comprise Model C–35–D, silicon controlled rectifiers, manufactured and sold by the General Electric Company. The two diode rectifiers 21 and 22 are IN2156 semiconductor type diode rectifiers also manufactured and sold by the General Electric Company, and the capacitor may comprise a two microfarad capacitor. The inductor is a 60 microhenry inductor and the direct current power supply preferably comprises a 125 volt direct current supply.

In operation, the single-phase inverter circuit of FIGURE 1 will have a gating signal source to supply the gating signals to the gating electrodes of each of the gate controlled rectifiers 11 through 14 respectively. Considering first a no load condition of operation, the wave shape of the voltages at various points in the inverter circuit are shown in FIGURE 13a of the drawings for one cycle of operation. The gating signal supply source mentioned above first gates on the gate controlled rectifier 11. The time intervals during which each of the gate controlled rectifiers is turned on in the circuit are depicted by the arrows shown over the wave shape of FIGURE 13a. The conduction intervals of commutating diodes 21 and 22 are similarly depicted. The potentials for a cycle of operation are indicated by each of the three curves 23, 24, and 25, and these potentials represent the potentials appearing at the points 23, 24, and 25 of the circuit respectively. Since the potential appearing at point 25 represents, in essence, the output load voltage being supplied by the inverter, this potential wave shape is shown by the solid line 25 in FIGURE 13a. From an examination of this curve it can be appreciated that for the interval of time that the gate controlled rectifier 11 is on, the potential at the point 25 will be essentially the potential of the positive terminal of the center-tap direct current supply source. During the interval of time while the gate controlled rectifier 11 is conducting, the point 24 will be essentially at the same potential as the point 25 and hence the positive terminal of the D.C. supply, while the point 23 will be maintained at some negative potential value lower than the negative potential of the power supply. Hence, the capacitor 18 will be charged with the polarities indicated in FIGURE 1 to a potential somewhat greater than the value of the direct current supply source for a no load condition. Thereafter, upon the gate controlled rectifier 13 being rendered conductive, the potential of the point 23 will jump to the positive terminal of the D.C. supply, and the potential of the point 24 will jump above the positive terminal of the D.C. supply source by the amount of the potential across the capacitor 18, as indicated by the dashed-dot line in FIGURE 13a. Upon this occurrence, the capacitor 18 will be discharged by a current through the inductor 19, and through the commutating diode 21 and the gate controlled rectifier 13, and will maintain a reverse polarity potential across the gate controlled rectifier 11 thereby causing this gate controlled rectifier to be turned off. In discharging through the inductor 19, a magnetic field will be built up around the inductor which upon collapsing will cause a reverse polarity charge to be built up across the capacitor 18 so that the point 24 becomes negative with respect to the point 23 as depicted by the dashed-dot line 24 shown in FIGURE 13a wherein near the middle of the time interval 13, it can be seen that the potential of point 24 drops to some negative value below zero, indicated at 26. Thereafter, the load current carrying gate controlled rectifier 12 is rendered conductive, and this results in connecting the point 25 to the negative terminal of the D.C. supply thereby immediately driving the potential of the point 25 from the full positive potential of the D.C. supply down to its full negative potential in the manner shown by the solid line 25. At this time, the value of the charge on the capacitor 18 will be at some point indicated at 26, so that upon the gate controlled rectifier 12 being rendered conductive, the capacitor will be charged further towards the full negative value of the D.C. supply as indicated by the dashed-dot line.

Due to the flywheel effect of the inductor 19, the capacitor 18 will be charged to a potential somewhat beyond the full negative value of the D.C. supply at the end of the time interval 13 when the flow of charging current through gate controlled rectifier 13 ceases. At this time, the potential of point 24 becomes equal to the negative terminal of the D.C. supply and the potential of point 23 rises above the positive terminal of the D.C. supply, impressing a reverse voltage across gate controlled rectifier 13 and thereby turning it off.

At the termination of the conduction interval 12, the gate controlled rectifier 14 will be rendered conductive, and the reverse procedure of that described above will occur. That is to say, the point 23 will be tied to the full value of the negative potential of the D.C. supply so that the point 24 will be driven to a potential below the negative terminal of the supply by the amount of the charge on capacitor 18, as depicted by the dashed-dot curve. As a consequence, a current will flow through the inductor 19 in the reverse direction, and through commutating diode 22 and the gate controlled rectifier 14 to discharge the capacitor 18. This current produces a reverse polarity potential across the gate controlled rectifier 12 which causes it to again become nonconducting. During this commutation period, due to the flywheel effect of the inductor 19, the capacitor 18 will be reversely charged so that again the point 24 will be driven positive to some value indicated at 27 on the dashed-dot curve of FIGURE 13a. Thereafter, upon the gate controlled rectifier 11 being turned on again by the gating signal source, the potential of the point 25 will immediately go to the full positive value of the D.C. supply source resulting in the production of a square wave output at the terminal 25 which is supplied to load 17. Concurrently, the point 24 will be further charged up to and beyond the full value of the positive D.C. supply source thereby completely recharging the capacitor 18 with the original polarity indicated in FIGURE 1 to a potential somewhat greater than the full potential of the D.C. supply source. During the commutation periods of the load current carrying rectifiers 11 and 12 while the capacitor 18 is being charged, the commutating diodes 21 and 22 respectively will serve to clamp the potential of point 25 to the positive and negative terminals respectively of the D.C. supply so that it does not exceed these limits. The point 24 and the capacitor 18, however, will be charged to some potential value greater than the supply source potential by an amount determined primarily by the power losses during the commutation periods and the time delay between the conducting intervals 11 and 12 in FIGURE 13a as established by the control circuit.

The operating conditions for the single-phase inverter circuit of FIGURE 1 supplying an inductive load are indicated in FIGURE 13b of the drawings. From examination of FIGURE 13b, it can be seen that the effect of the inductive load is to further increase the reverse charge built up on the capacitor 18 during the commutating interval by the combined flywheel effect both in inductor 19 and in the inductive load. As a result, the magnitude of the discharge current of the capacitor 18, which must exceed the load current in order to successfully commutate the load current carrying controlled rectifiers, increases as the load current increases, thereby enabling a still greater load current to be supplied by the inverter. A similar effect occurs when the load is purely resistive, but when the load has a leading power factor the operating wave forms remain similar to the no load condition. It should also be noted that for either the no load condition or load conditoin, the potential appearing across the load is a square wave potential. This square wave potential results from the fact that the load current carrying gate controlled rectifiers 11 and 12 are quickly commutated off without requiring any load current to accomplish the commutation, and any circulating reactive load currents are returned to the D.C. supply by the commutating diodes 21 and 22 so that they will not interfere with the operation of the inverter. This results in greatly improving the efficiency of the circuit since the load current does not have to flow through any commutating inductance, and results in much better regulation as well as allowing the circuit to be operated to much higher frequencies. This improved efficiency and high operating frequencies are further made possible by the fact that no large circulating currents are built up during the commutating intervals due to excess energy being drawn from the D.C. supply to accomplish commutation. As a consequence, the circuit can be used up to much higher frequencies than circuits heretofore available thereby allowing the circuit to be used over a wider range of frequencies. The commutating intervals of time 13 and 14 under the no load condition depicted in FIGURE 13a are approximately one cycle of the frequency to which the capacitor 18 and the inductor 19 are series tuned. From a consideration of the above description of operation, it can be appreciated that the inductor 19 operates as a flywheel utilizing the energy required to achieve commutation at the end of one interval of conduction to partially recharge the capacitor 18 thereby conserving this energy for use in achieving commutation during the succeeding commutation interval. As a consequence of this mode of operation, there is little or no energy wasted to accomplish commutation and results in a circuit which is in the order of 98% efficient with respect to the useful use of the electrical energy drawn from the supply 15.

A bridge version of the single-phase inverter circuit constructed in accordance with the invention is shown in FIGURE 2, and actually comprises two single-phase inverters of the type described with relation to FIGURE 1 connected to a common load. Accordingly, there are two sets of series connected load current carrying gate controlled rectifiers 11, 12 and 11', 12', connected across a direct current power supply 28. The juncture of the load current carrying gate controlled rectifiers in each set is connected through a series connected capacitor 18 or 18' and inductor 19 or 19' to the juncture of a set of series connected commutating gate controlled rectifiers 13, 14 or 13', 14'. Each of the load current carrying gate controlled rectifiers 11, 12 and 11', 12' has a commutating diode 21, 22 or 21', 22' respectively, connected thereacross in reverse polarity relationship, and a load device 29 is connected between the junctures of the load current carrying gate controlled rectifiers 11, 12 and the rectifiers 11', 12'.

In operation, the circuit of FIGURE 2 functions in much the same manner as the circuit of FIGURE 1 insofar as the commutation portion of the operation is concerned. It can be appreciated, however, that the circuit functions in the manner of a bridge to develop load voltage across the load device 29. For example, where two diametrically opposite load current rectifiers such as 11 and 12' are conducting, load voltage will be supplied to the load 29, but if the two load current carrying rectifiers 12 and 12' are conducting, no load voltage will be supplied to the load 29. The time intervals during which the various load current gate controlled rectifiers 11, 12 and 11', 12' are conducting are shown in FIGURE 13d of the drawings. The resulting load voltage is shown just below the gating on time periods and it can be appreciated that during those intervals where two gate controlled rectifiers which are connected to the same side of the D.C. supply are gated on concurrently, no load voltage is developed. By varying the amount of overlap that such concurrent conduction occurs, it is possible to vary the width of the voltage pulses developed through the load device in a manner depicted by the dotted lines in FIGURE 13b of the drawings. In other respects, the bridge inverter of FIGURE 2 functions in much the same manner as the circuit of FIGURE 1, that is to say, that the load current carrying gate controlled rectifier 11 will be commutated off by the discharge of capacitor 18 through the inductor 19, and the commutating diode 21 or gate controlled rectifier 11 upon the commutating gate controlled rectifier 13 being turned on by the gating signal source. During this commutating period, a reverse change will be built up on the capacitor 18 so that it will be ready to commutate off the load current carrying gate controlled rectifier 12 upon its associated commutating gate controlled rectifier 14 being turned on by the gating signal source. Similarly, the commutating rectifiers 13' and 14' will function through their associated capacitor 18' and inductor 19' to turn off the load current carrying gate controlled rectifiers 11' and 12' during their commutating intervals. Needless to say, the value of the load current developed through the load device 29 can be readily adjusted by adjusting the intervals of time during which the load current gate controlled rectifiers 11, 12 and 11', 12' are allowed to conduct. Thus, the bridge type inverter of FIGURE 2 makes available a variable pulse width inverter circuit that can be easily adjusted to provide any desired amount of power to the load device 29. Additionally, the circuit of FIGURE 2 does not require a center-tap power supply which is a further advantage.

Figure 3:
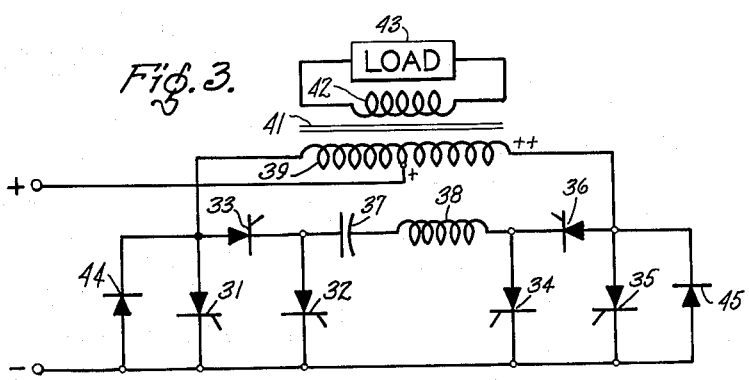
FIGURE 3 is a schematic circuit diagram of an inverter circuit constructed in accordance with the present invention which employs a center-tap load transformer.

A center-tap transformer inverter circuit constructed in accordance with the invention is shown in FIGURE 3. The inverter of FIGURE 3 is comprised by a first set of two parallel connected gate controlled rectifiers 31 and 32 interconnected in parallel circuit relationship through a first holding off gate controlled rectifier 33, and a second set of two parallel connected gate controlled rectifiers 34, 35 likewise interconnected in parallel circuit relationship through a second holding off gate controlled rectifier 36. The two sets of gate controlled rectifiers 31, 32 and 34, 35 are connected in parallel circuit relationship through a series connected capacitor 37 and an inductor 38. Each of the sets of parallel connected gate controlled rectifiers have their anodes connected to a respective end of the primary winding 39 of a transformer 41 having its secondary winding 42 connected across a suitable load device 43. The primary winding 39 has its center-tap connected to the positive terminal of a direct current power supply source, and the negative terminal of the direct current power supply is connected to the cathodes of the two sets of gate controlled rectifiers. Additionally, a commutating diode 44 is connected in parallel with the gate controlled rectifier 31 in a reverse polarity sense, and a commutating diode 45 is connected in parallel with the gate controlled rectifier 35 in a reverse polarity sense.

In operation, the center-tap transformer inverter shown in FIGURE 3 will have a source of gating signals (not shown) connected to the gating electrodes of all of the gate controlled rectifiers so as to turn on these gate controlled rectifiers in a predetermined sequence. The gating sequence is such that upon the gate controlled rectifier 31 being gated on by the gating signal source, current will be conducted through the primary winding half 39 and through the gate controlled rectifier 31 having the polarities indicated. This current will, of course, induce a voltage in the other half of the primary winding to about double the supply voltage at the end of the winding marked ++. Concurrently, the current transformed into the secondary winding 42 will be supplied to the load 43 with a given polarity. Thereafter, in order to commutate off the gate controlled rectifier 31, the two gate controlled rectifiers 33 and 34 are gated on simultaneously. This allows the charge which has been built up on the capacitor 37 to be discharged through the inductor 38 and the commutating diode 44, and apply a reverse polarity potential across the gate controlled rectifier 31 to turn it off. During this commutating action, the gate controlled rectifier 36 holds off the ++ potential of the primary winding half to prevent it from interfering with the commutating action. During commutation, a charge of the reverse polarity is built up across the capacitor 37 by the flywheel action of inductor 38. Upon the gate controlled rectifier 35 being gated on, current will then be conducted from the mid-tap point through the gate controlled rectifier 35 so as to reverse the polarity of the potentials illustrated, and thereby reverse the polarity of the current being supplied through the load device 43. The gating signal source commutates the gate controlled rectifier 35 off by turning on the two gate controlled rectifiers 32 and 36. This allows the reverse polarity potential built up across the capacitor 37 to be discharged through the inductor 38 and the commutating diode 45 across the gate controlled rectifier 35 to commutate it off. During this action, the gate controlled rectifier 33 holds off the double value positive potential built up at the end of the transformer winding half 39 due to the transformer action so that it does not interfere with the commutation of the gate controlled rectifier 35. The particular embodiment of the inverter circuit shown in FIGURE 3 is particularly good for use with low voltage D.C. supplies in that it makes available across the capacitor 37 at least double the voltage of the D.C. supply. Further, this version of the inverter circuit does not require a center-tap on the direct current power supply, but still needs only two load current carrying gate controlled rectifiers.

Still another form of bridge inverter circuit constructed in accordance with the invention is shown in FIGURE 4. The bridge inverter circuit of FIGURE 4 includes a first set of two series connected load current carrying gate controlled rectifiers 51 and 52, and a second set of two series connected load current carrying gate controlled rectifiers 53 and 54. These two sets of gate controlled rectifiers are connected across a direct current supply source having the polarities indicated together with one set of series connected commutating gate controlled rectifiers 55 and 56 associated with the load current carrying gate controlled rectifiers 53 and 52 respectively, a second set of series connected commutating gate controlled rectifiers 57 and 58 associated with the two load current carrying gate controlled rectifiers 51 and 54 respectively. A load device 59 is connected between the junctures of the two controlled rectifiers 51 and 52 and the juncture of the two controlled rectifiers 53 and 54. In order to use reactive loads with the inverter circuits, commutating diodes 61, 62, 63, and 64 are connected in parallel circuit relationship across each of the load current carrying gate controlled rectifiers 51 through 54, respectively. In order to commutate the bridge inverter, a capacitor 65 and inductor 66 are connected in series circuit relationship between the juncture of each of the commutating gate controlled rectifiers 55 and 56 and the juncture of the commutating gate controlled rectifiers 57 and 58. These four last mentioned commutating gate controlled rectifiers are denoted as first commutating gate controlled rectifiers, a set of second commutating gate controlled rectifiers are formed by four commutating gate controlled rectifiers 67 through 70. The second commutating gate controlled rectifier 67 is connected between the juncture of the first load current carrying controlled rectifiers 51 and 52, and the juncture of the first commutating controlled rectifiers 55 and 56. The second commutating controlled rectifier 68 is connected between the juncture of the second load current carrying controlled rectifiers 53, 54, and the juncture of the first commutating gate controlled rectifiers 55, 56. Similarly, the second commutating gate controlled rectifier 69 is connected between the juncture of the first load current carrying gate controlled rectifiers 51, 52 and the juncture of the first commutating gate controlled rectifiers 57, 58. Lastly, the second commutating gate controlled rectifier 70 is connected between the juncture of the second load current carrying controlled rectifiers 53, 54, and the juncture of the commutating controlled rectifiers 57 and 58. A source of gating signals (not shown) is adapted to be connected to the gating electrodes of each of the gate controlled rectifiers for gating on these rectifiers in the predetermined sequence as set forth below.

In operation, load current is supplied to the load device 59 only when there are two of the load current gate controlled rectifiers such as 51 and 54 gated on or such as the combination 52 and 53. The time relationship with respect to which these pairs of gate controlled rectifiers are turned on determines the amount of load current supplied to the load device. Accordingly, the gating signal source (not shown) connected to the gate control electrodes of all of the gate controlled rectifiers is arranged such that the gate controlled rectifier 51 is turned on and, subsequently, the gate controlled rectifier 54. The gate controlled rectifier 51 is then commutated off. This is accomplished by turning on the two commutating rectifiers 67 and 57. This results in allowing the charge built up on the capacitor 65 to be discharged through the inductor 66 back across the load current carrying gate controlled rectifier 51 or commutating diode 61 to thereby reverse the potential across this gate controlled rectifier 51 and to turn it off. This commutating action will result in producing a reverse polarity charge across the capacitor 65 so that it is then ready with the proper polarity charge to commutate off the load current carrying gate controlled rectifier 54. Immediatey following the operation of commutating or turning off the load current carrying controlled rectifier 51, the gating signal source will turn on the gate controlled rectifier 52 so as to commence the operation of connecting the load device 59 back across the D.C. supply source with a reverse polarity connection. During the time interval in which the gate controlled rectifiers 52 and 54 are gated on, both terminals of the load device 59 are effectively connected to the negative terminal of the D.C. supply and hence no voltage is applied across the load. Subsequently, the two commutating gate controlled rectifiers 58 and 68 are turned on to thereby allow the reverse polarity charge built up across the capacitor 65 to be applied back across the load current carrying gate controlled rectifier 54 and thereby turn this rectifier off. As a consequence of this commutating action, the current in discharging through the inductor 66 will cause a field to build up which upon collapsing will recharge the capacitor partially in a reverse polarity direction so that it will then be ready to commutate off the load current carrying gate controlled rectifier 52. Immediately following the commutation of gate controlled rectifier 54, the gating signal source will turn on the gate controlled rectifier 53 so as to complete the operation of connecting the load device 59 back across the D.C. supply with a reverse polarity connection. The same sequence of operation is then carried out in connection with the two load current carrying rectifiers 52 and 53 so that the firing sequence is to (1) turn on the two gate controlled rectifiers 51 and 54, (2) turn off controlled rectifier 51, (3) turn on controlled rectifier 52, (4) turn off controlled rectifier 54, (5) turn on controlled rectifier 53, (6) turn off controlled rectifier 52, (7) turn on controlled rectifier 51, (8) turn off controlled rectifier 53, and finally (9) turn on controlled rectifier 54 to complete the cycle. This results in developing a square wave alternating current potential across the load device 59 with intervening periods of zero load potential. Since only a single capacitor-inductor commutating circuit is required by the arrangement shown in FIGURE 4, the inverter is smaller in size and the charging and discharging of the capacitor 65 is accomplished at twice the rate of either capacitor 18 or 18' in the previously described bridge circuit of FIGURE 2. Hence the circuit of FIGURE 4 can respond more quickly to changes in the condition of loading.

FIGURE 5 of the drawings shows a three-phase version of a bridge inverter constructed in accordance with the invention. The three-phase bridge inverter shown in FIGURE 5 employs three single-phase inverter circuits of the type shown and described with relation to FIGURE 1 of the drawings and with the exception that no center-tap direct current power supply is required. Instead, the juncture of each of the load current carrying gate controlled rectifiers 11, 12, 11', 12' and 11", 12" are connected together through respective elements of the three-phase loads 71, 72, and 73. The load element 71 is connected between the juncture of the load current carrying gate controlled rectifiers 11, 12 and the juncture of the gate controlled rectifiers 11', 12'. The load element 72 is connected between the juncture of the gate controlled rectifiers 11', 12', and 11", 12", and the third load element 73 is connected between the juncture of the gate controlled rectifiers 11", 12", and the juncture of the gate controlled rectifiers 11, 12. By connecting the load elements in this manner, when the load current carrying gate controlled rectifiers 11 and 12', for example, are gated on by the gating signal source (not shown), load current will be supplied through the load element 71. Thereafter, upon commutating off these gate controlled rectifiers and turning on the two load current carrying rectifiers 12 and 11', current of the reverse polarity will be conducted through the same load element 71. The same type of operation occurs with respect to the other two load elements 72, 73 so that it can be appreciated that the elements of the three-phase load will be supplied with alternating current square wave potential whose magnitude is dependent upon the periods of time during which the load current carrying gate controlled rectifiers are allowed to conduct. In order to commutate off the load current carrying gate controlled rectifiers, the commutating action supplied by the capacitor 18 and inductor 19 connected in series circuit relationship between the juncture of the two load current carrying gate controlled rectifiers and the two commutating gate controlled rectifiers 13, 14, is identical to that described with relation to FIGURE 1 of the drawings, and hence will not again be described in detail.

A preferred form of bridge inverter circuit constructed in accordance with the invention is shown in FIGURE 6. The bridge inverter of FIGURE 6 is similar in all major respects to the bridge inverter of FIGURE 2 of the drawings and differs therefrom in that it includes a number of cushioning networks and a resistance capacitor transient limiting network which operate to limit or cushion the transient potentials developed across the gate controlled rectifiers of the circuit as they are rapidly switched on and off during the operation of the inverter The bridge inverter is comprised by two sets of two series connected load current carrying gate controlled rectifiers 11, 12, and 11', 12' connected across the 125 volt direct current power supply source, and two sets of two series connected commutating gate controlled rectifiers 13, 14 and 13', 14' also connected across the direct current power supply. The junctures of the commutating controlled rectifiers are each connected to a series circuit comprised by a capacitor 18 and an inductor 19, or a capacitor 18' and an inductor 19', respectively, through the junctures of the respective associated load current carrying gate controlled rectifiers 11, 12 or 11', 12'. The load to be supplied with the inverted square wave alternating current potential 29 is connected between the juncture of the two sets of load current carrying gate controlled rectifiers 11, 12, and 11', 12'. Commutating diodes 21, 22, 21', 22' are connected across gate controlled rectifiers 11, 12, 11', 12', respectively, In these respects, the invention as shown in FIGURE 6 is identical to the bridge inverter shown in FIGURE 2. The circuit differs, however, in the inclusion of a series connected resistor 81 and capacitor 82 connected in parallel circuit relationship with each of the commutating gate controlled rectifiers 13, 14 and 13', 14'. Each of these networks serves as a transient suppression network for preventing large transient changes in potential from appearing across the commutating gate controlled rectifiers instantaneously in that they serve to limit the rate of rise of these potentials to some value better accommodated by the commutating gate controlled rectifiers. A similar resistance-capacitance cushioning network is connected across each of the load current carrying gate controlled rectifiers 11, 12, 11', 12' and comprises a resistor 83 and parallel connected diode 84 connected in series with a capacitor 85 across each of the load current carrying gate controlled rectifiers 11, 12 and 11', 12'. In operation, the resistance-capacitance suppression network comprised by resistor 83 and capacitor 85 and diode 84 serve to limit the rate of rise of transient potentials across the load current carrying gate controlled rectifiers.

Figure 6A:
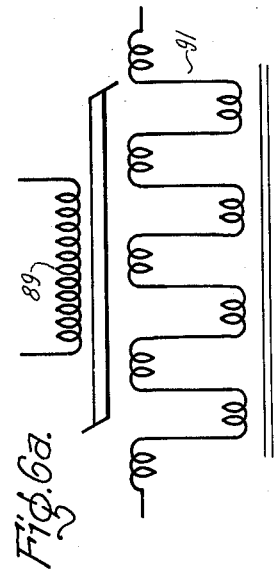
FIGURE 6A shows the manner of fabrication of the windings of a cushioning transformer.

Additional transient cushioning effects are provided by a pair of saturable transformers 88, 88' having one end each of their primary winding 89, 89' connected to each of the load current carrying gate controlled rectifiers 11, 12 or 11', 12'. The center-taps of the primary winding 89 and 89' are connected to respective sides of the load device 29, and are also connected to the series connected inductor-capacitor commutating circuits 18, 19 and 18', 19' respectively. The secondary windings 91, 91' of the cushioning transformers are connected in series circuit relationship across the direct current power supply through a suitable current limiting resistor 92. The bias current flowing in the secondary windings due to this connection causes the saturable transformer to be set in its negative saturation condition where the potential across the winding is positive at the dot end. Upon one of the load current carrying gate controlled rectifiers, such as 11, being gated on, the full line potential will not be applied instantaneously across the remaining gate controlled rectifier in the pair (12) due to the reactive effect of the primary winding 89 which holds off the line potential until the capacitor 85 associated with gate controlled rectifier 12 is fully charged to line potential. This reactive effect is produced by the current flowing in the winding 89 partially resetting the core of the saturable transformer towards its positive saturation condition. Thereafter, during the following half cycle of operation, the D.C. bias current will return the core to its negative saturation condition to prepare it for the next half cycle of operation. Current flowing in the primary 89 as a result of this setting action is returned through resistor 86 and diode 87. FIGURE 6a of the drawings shows the actual manner in which the secondary windings 91 of the cushioning transformer 88 are fabricated so that the same secondary windings 91 also are wound around a non-saturating core which performs the function of a D.C. choke. The primary windings 89 are wound around the saturating core only, and do not link the non-saturating core. In this way, the voltage induced in each segment of the secondary windings by the saturating core is cancelled by an equal but opposite polarity voltage induced in the adjacent segment of the secondary windings by the non-saturating core, thereby preventing the build up of very high voltages across the secondary windings.

In operation, the circuit of FIGURE 6 functions in an identical manner to the circuit of FIGURE 2 by gating on selectively the load current carrying gate controlled rectifiers by means of a gating signal source (not shown) connected to the respective gating electrodes of the gate controlled rectifiers. Load current is supplied to the load device 29 by gating on each pair of diametrically opposed load current carrying gate controlled rectifiers such as 11 and 12' or 11' and 12. By varying the periods of time during which these pairs of load current gate controlled rectifiers are conducting, the magnitude of the load current supplied can be readily controlled. Commutation of conduction through the load current carrying rectifiers is achieved in the identical manner to that described with relation to FIGURE 2 through discharge of the respective associated charging capacitors 18 or 18' through its inductors 19 or 19' and commutating rectifiers 13, 14 or 13', 14'. Hence, the commutation operation will not again be described in detail. During operation of the inverter, the RC and saturating transformer transient suppressing networks function in the manner described to limit the rate of rise of potential across the various rectifiers when they are in their blocking condition so as to insure against a breakdown of these rectifiers and maximize efficient operation of the circuit.

A gating signal source suitable for use with the bridge inverter of FIGURE 6 is shown in FIGURE 14. The gating signal source of FIGURE 14 is comprised by a low power unijunction transistor-oscillator 101 and two low power transistor-inverter circuits 102 and 103 which function to supply the inverted square waves from a direct current power supply source through assorted saturable reactors to develop time delayed pulses and square waves suitable for use in gating on the various gate controlled rectifiers of the bridge inverter of FIGURE 6. The unijunction transistor 104 has one of its base electrodes connected through a resistor to the positive terminal of the direct current supply by way of an ON-OFF switch and a suitable fusing device. The remaining base electrode of unijunction transistor 104 is connected to a midtap point of a saturable reactor 105. The saturable reactor 105 has one of its ends connected through a pair of opposed series connected diode rectifiers 106 to the negative terminal of the direct current power supply and has the remaining end of the saturable inductor 105 connected through a similar set of opposed series connected diode rectifiers 107 to the negative terminal. The junction points of the two opposed series connected diode rectifiers 106 and 107 are each adapted to have gating potentials applied thereto as will be described more fully hereinafter for gating open either one or the other sets of rectifiers to selectively connect one end or the other of the saturable reactor 105 to the negative terminal. The emitter-electrode of unijunction transistor 104 is connected to a voltage dividing circuit comprised by a capacitor 108 and a variable resistor 109 which can be adjusted to control the frequency of operation of the unijunction transistor-oscillator circuit comprised by the components described above.

The saturable inductor 105 has an inductively coupled secondary winding 111 which has its mid-tap point connected to the positive terminal of the direct current power supply, and has each of its ends connected through suitable current limiting resistors to the base electrodes of a pair of PNP transistors 112 and 113. The transistors 112 and 113 coact to form the low power transistor inverter circuit 102, which further includes a transformer in which the primary winding 114 is connected between the collector-electrodes of each of the transistors 112 and 113 and has its mid-tap point connected to the negative terminal of the direct current supply. The emitter-electrodes of the transistors 112 and 113 are interconnected in common through the mid-tap point of the secondary winding 111 of saturable reactor 105, and through the mid-tap point of the secondary winding 115 of transformer 114 that has its end points likewise connected through current limiting resistors to the base electrodes of the two transistors 112 and 113, respectively. The transistor inverter 102 is conventional in construction and operation, and hence will not be described in detail. Briefly, however, the circuit is biased to a point so that the addition of a small voltage inductively coupled into the secondary winding 111 from the saturable inductor 105 of the unijunction transistor-oscillator 101 is adequate to gate on either one or the other of the PNP transistors 112 or 113 whichever is in the nonconducting state. For example, assuming a negative polarity gating signal is applied to the junction of the diode rectifiers 106 allowing conduction to take place through the unijunction transistor 104 and the dot end of the saturable inductor 105, then a voltage will be induced in the secondary winding 111 which will be positive at the no dot end of that winding. This will be adequate to turn off the transistor 112 and allow the transistor 113 to conduct. Conduction through the transistor 113 causes current to flow through the no dot end of the transformer primary winding 114, which is inductively coupled back to the secondary winding 115 in a manner such that the current flow in this winding 115 further increases the positive polarity at the no dot end of this winding, and hence the positive polarity potential applied to the base electrode of the transistor 112 essentially drives this transistor into cutoff and turns the transistor 113 full on. This condition of operation will continue until such time that another gating pulse is supplied from the saturable inductor 105 of the unijunction transistor-oscillator 101 due to conduction through the diode rectifier 107 and through the no dot end of the saturable inductor 105. This switching potential will then reverse the condition of operation so that the transistor 112 is turned full on, and the transistor 113 is essentially driven into cutoff. The resulting output from the low power transistor inverter 102 is a square wave potential which is supplied over the conductors 116 and 118 to a current limiting circuit, comprised by a diode rectifier bridge 119, and to the primary winding 123 of a saturable transformer 124. The transformer 124 has two secondary windings 125 and 126 which are connected through suitable current limiting resistors to output terminals 305–308 that are connected to the gating electrodes of the various gate controlled rectifiers in the circuit of FIGURE 6 at the points indicated by the numerals associated therewith. Additionally, the transformer primary winding 114 is inductively coupled to additional secondary windings 127 and 128 that, in turn, are connected through respective wave forming circuits. The wave forming circuits are comprised by a saturable inductor 129 and series connected resistor 131 connected in parallel with a diode rectifier 132 and a load resistor 133 connected across the output terminals 301–304 to similarly identified terminal points on the gate controlled rectifiers of the bridge inverter circuit of FIGURE 6. The potentials appearing across the secondary windings 127 and 128 are essentially square wave in nature but the rise in potential at the output terminals is delayed somewhat due to the wave shaping effect of the saturable inductor 129 and its associated circuitry, while the potentials appearing across the secondary windings 125 and 126 of saturable transformer 124 are essentially pulsed in nature.

In addition to the gating potentials supplied to the output terminals 301 through 308, the low power transistor inverter circuit 102 supplies a triggering potential to the second low power transistor inverter circuit 103. This is accomplished through a parallel connected magnetic amplifier 135, of conventional construction, which is connected in series circuit with a pulse shaping circuit formed by a resistor 139, a first saturable reactor 137, and a second saturable reactor 138 connected in parallel with a capacitor 141 between the two conductors 116 and 118. The magnetic amplifier 135 has its control winding 136 connected across a variable resistor 134 that, in turn, is connected across the D.C. supply source. The variable resistor 134 controls the phasing at which the parallel connected magnetic amplifier cores saturate so that the amplifier supplies a signal pulse to the pulse shaping circuit formed by the two saturable reactors 137 and 138. These two reactors serve to form the signal pulse supplied thereto into a sharp triggering pulse which is inductively coupled to the secondary winding 111' of the saturable reactor 138 in order to switch the second low power transistor inverter circuit 103.

The second low power transistor inverter circuit 103 is identical in construction and operation to the first low power transistor inverter circuit 102, and hence will not be described again in detail. The square wave potential appearing across its output conductors 116' and 117' is likewise supplied through a current limiting circuit 119' to the primary winding 123' of a saturable transformer 124', and thence to the output terminals 313–316 connected to the respective gating electrodes of the bridge inverter circuit of FIGURE 6. Similarly, the transformer primary winding 114' is inductively coupled to the two secondary windings 127' and 128' to provide square wave potentials at the output terminals 309–312. It should be noted that these square wave potentials will be delayed in phase with respect to the potentials at output terminals 301–304 for a predetermined period equal to the pulse width of the square wave output potential desired from the bridge inverter circuit of FIGURE 6, and as determined by the setting of the variable resistor 134. Additionally, it should be noted that the potentials appearing across conductors 116', 117' are supplied back through the conductors 142 and 143 back to the junction of the diode rectifiers 106 and 107 to gate these rectifiers on and off as determined by the polarities of the potentials appearing across the conductors 116' and 117'. In this manner, the operation of the gating signal source will be synchronized so that properly phased square wave potentials and gating signal pulses are applied in the proper time sequence to the gating electrodes of the gate controlled rectifiers in the bridge inverter circuit of FIGURE 6.

Still a different form of gate controlled rectifier inverter circuit constructed in accordance with the invention is shown in FIGURE 7 of the drawings. The inverter circuit of FIGURE 7 includes a pair of reverse polarity connected commutating gate controlled rectifiers 201 and 202 which are connected in parallel circuit relationship with each other. The reverse polarity parallel connected commutating rectifiers 201 and 202 are connected in series circuit relationship with a charging capacitor 203 and an inductor 204. The series circuit thus formed is connected to a mid-tap point of a direct current power supply source, and to the juncture of a pair of series connected load current carrying gate controlled rectifiers 205 and 206 connected in series circuit relationship across the direct current power supply. Commutating diodes 207 and 208 are connected in parallel across each of the gate controlled rectifiers 205 and 206, respectively, in reverse polarity relationship with respect to the gate controlled rectifiers. A load device 209 is connected across the series circuit comprised by the two parallel connected commutating gate controlled rectifiers 201 and 202, capacitor 203 and inductor 204.

In operation, the circuit of FIGURE 7 functions somewhat similar to the single-phase inverter circuit of FIGURE 1. Gating signals are supplied to each of the gate controlled rectifiers 201, 202, 205, and 206 from a suitable gating signal source (not shown) in a manner such that the gate controlled rectifiers 205 and 201 are first gated on. Upon this occurrence, load current will be supplied to the load 209 so the potential at point 213 will approximately equal that of the positive terminal of the direct current power supply. This will effectively charge the capacitor 203 through the inductor 204 and the gate controlled rectifier 201 to a potential approximately equal to double the direct current power supply potential from the centertap to the positive terminals, as shown by the dotted line 211 in FIGURE 13c of the drawings. Thereafter, in order to commutate off the load current carrying gate controlled rectifier 205, the commutating gate controlled rectifier 202 is gated by the gating pulse signal source (not shown). Upon the gate controlled rectifier 202 being turned on, the charge on the capacitor 203 will discharge through the inductor 204 and either commutating diode 207 or gate controlled rectifier 205. This provides a reverse polarity potential across the gate controlled rectifier 205 and thereby turns it off. This commutating action is depicted by the curve 212 shown in FIGURE 13c which shows the potential appearing at the point 212 in FIGURE 7 of the drawings. From an examination of this curve, it can be seen that upon the commutating gate controlled rectifier 202 being turned on the potential at point 212 immediately jumps up to equal or approximately equal that of the point 211, and thereafter the two potentials drop down due to discharge of the capacitor through the now conducting gate controlled rectifier 202 and inductor 204 to some intermediate value at point 215, at which point in time the load current carrying gate controlled rectifier 206 will be turned on by the gating signal source. Upon this occurrence, the polarity of the potential at point 213 immediately drops, as shown, to approximately equal the full negative value of the direct current power supply so that the capacitor 203 will be charged in the reverse direction negatively in order to be in condition to commutate off the load current gate controlled rectifier 206 at the end of its conducting interval. It can be seen from an examination of the curve 213 that the commutating diodes 207 and 208 serve to limit the value of the potential at the point 213 to maintain this at no higher level than the direct current power supply. Hence, in addition to serving as a return path for reactive load currents to the direct current power supply, the commutating diodes 207 and 208 serve to clamp the potential of the point 213 to a value approximately equal to that of the direct current power supply. At the end of the conduction period of the load current carrying gate controlled rectifier 206, the commutating gate controlled rectifier 201 will be turned on again by the gating signal source. Upon this occurrence, the potential at point 212 will immediately jump to approximately equal the potential at the point 211, and therefore the potentials of both points will drop down to approximately equal zero as the capacitor 203 is discharged through the commutating gate controlled rectifier 202 and inductor 204 and results in commutating off the gate controlled rectifier 206. At this point in time, the first mentioned load current gate controlled rectifier 205 is again turned on by the gating signal source so that the process is again carried out thereby completing a cycle of operation. The chief advantage of the single-phase inverter circuit of FIGURE 7 is that it does not require that load current supplied to the load 209 flow through any commutating inductance. Hence, better efficiency and better voltage regulation can be obtained from the circuit than would otherwise be the situation. Additionally, it should be noted that the commutating voltage built up on the capacitor 203 will be proportional to the load voltage. The circuit is not quite as efficient in operation as the species of inverter circuits shown in FIGURES 1 through 6, however, in that it does not recirculate the charge on the capacitor 203 back into the capacitor at the end of the commutating interval to recharge the capacitor in the reverse direction for the next commutating cycle. Instead, the capacitor 203 must be charged in advance of each commutating cycle from the power source.

A second form of inverter constructed in accordance with the invention which follows along the lines of the inverter circuit shown in FIGURE 7 is illustrated in FIGURE 8. The inverter of FIGURE 8 includes a pair of series connected load current carrying gate controlled rectifiers 205 and 206 connected across a direct current power supply source in parallel with a pair of commutating diodes 207 and 208. A commutating circuit for commutating off the load current carrying controlled rectifiers 205, 206 is comprised by a pair of capacitors 216 and 217 connected in series circuit relationship across the direct current power supply source. A pair of reverse polarity parallel connected gate controlled rectifiers 201 and 202 are connected in series circuit with an inductor 204, and the series circuit thus comprised is connected between the juncture of the two load current carrying gate controlled rectifiers 205 and 206, and the juncture of the two capacitors 216 and 217. A suitable load device 218 is connected between a mid-tap point on the power supply source, and the juncture of the load current carrying gate controller rectifiers 205 and 206. In operation, the circuit of FIGURE 8 is almost identical to the operation of the FIGURE 7 circuit described above with the notable exception that the separate capacitors 216 and 217 each have about half the value of capacitance of the single capacitor 203 in the circuit of FIGURE 7.

A single-phase bridge inverter circuit that is similar in some respects to the circuit of FIGURE 7 is shown in FIGURE 9 of the drawings. The bridge inverter of FIGURE 9 includes two sets of two series connected load current carrying gate controlled rectifiers 221, 222, and 223, 224. Each set of series connected gate controlled rectifiers is connected across a source of direct current, and each gate controlled rectifier has a commutating diode 225, 226, 227 and 228, respectively, connected in parallel circuit relationship therewith for returning reactive load currents to the direct current power supply source. A pair of reverse polarity parallel connected gate controlled commutating rectifiers 229 and 231 are connected in series circuit relationship with an inductor 232 and a capacitor 233 between the juncture of the load current carrying gate controlled rectifiers 221 and 222, and the juncture of the load current gate controlled rectifiers 223, 224. A load to be supplied is connected across the series circuit thus formed.

In operation, the bridge inverter causes load current to flow through the load 234 by having two of the load current carrying gate controlled rectifiers such as 221 and 224 gated on concurrently. For this reason, a gating signal source (not shown) is used with the bridge inverter circuit of FIGURE 9 to turn on 221 and 224, commutate off 221 and 224, turn on 222 and 223, and commutate off 222 and 223, and this cycle then repeated. In this manner, the load 234 is alternately connected from one side of the direct current power supply to the other thereby causing a square wave alternating current potential to be supplied thereacross. In commutating off the gate controlled load current carrying rectifiers 221 through 224, the commutating gate controlled rectifier 231 will be used in turning off the load current carrying rectifiers 221 and 224, and the commutating gate controlled rectifier 229 will be used in commutating off the two load current carrying rectifiers 222 and 223. In other respects, the commutation operation is similar to that described with the single-phase inverter shown in FIGURE 7 in that the turning on of one of the commutating controlled rectifiers, for example 231, will cause the charge on the capacitor 233 to be discharged back through inductor 232 and the load current carrying controlled rectifier 221 or commutating diode 225, then through the D.C. supply and the controlled rectifier 224 or commutating diode 228 to produce a reverse polarity potential across controlled rectifiers 221 and 224 and thereby turn them off. For the next commutation cycle, the capacitor 233 must be precharged in the reverse polarity direction and this occurs upon the load current gate controlled rectifiers 222 and 223 being turned on as outlined in the sequence of operations set forth above.

A modified bridge inverter built along the lines of the circuit shown in FIGURE 8 is shown in FIGURE 10, and comprises two single-phase inverter circuits of the type disclosed in FIGURE 8 of the drawings which are interconnected through a suitable load. Because each of the single-phase inverter circuits is identical in construction and operation to that described with relation to FIGURE 8 of the drawings, it is not believed necessary to describe the bridge inverter of FIGURE 10 in detail. It should be noted, however, that the load device 235 to be supplied with square wave alternating current power is connected between the juncture of the two load current carrying gate controlled rectifiers 205, 206 and the juncture of the two load current carrying gate controlled rectifiers 205' and 206'. A gating signal source such as that shown in FIGURE 14 of the drawings is connected to the control gate elements of each of the gate controlled rectifiers for turning on the gate controlled rectifiers in a predetermined time sequence whereby the load 235 will have its terminals alternately connected from one side of the line to the other. Since the commutation operation required to turn off the load current carrying gate controlled rectifiers 205, 206, 205', 206' is identical to the commutation operation described with relation to the circuit shown in FIGURE 8 of the drawings, a further description of the operation is believed unnecessary.

Figure 11:
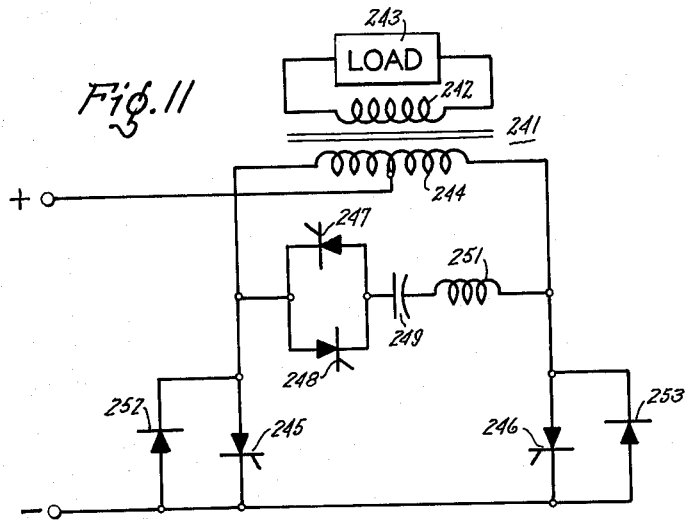
FIGURE 11 is a schematic circuit diagram of still another form of an inverter constructed in accordance with the invention which employs a center-tap load transformer.

A center-tap load transformer inverter circuit constructed in accordance with the invention is shown in FIGURE 11 of the drawings. The inverter of FIGURE 11 is formed by a transformer 241 having its secondary winding 242 connected to a suitable load device 243. The primary winding 244 of the transformer has each of its terminals connected through respective load current carrying gate controlled rectifiers 245 and 246 to the negative terminal of a direct current supply source. The mid-tap point of the primary winding 244 is connected to the positive terminal of the direct current supply source. A commutating circuit portion is provided which includes a pair of reverse polarity parallel connected gate controlled commutating rectifiers 247 and 248, connected in series circuit relationship with a charging capacitor 249 and inductor 251. The series circuit thus formed is connected across the primary winding 244 of the load transformer 241. In order to return reactive load currents developed in the primary winding 244 back to the direct current supply source, commutating diode rectifiers 252 and 253 are connected across each of the load current carrying gate controlled rectifiers 245 and 246 respectively.

In operation, upon one of the load current carrying gate controlled rectifiers such as 245 being gated on by the gating signal source (not shown), one of the end points of the primary winding 244 will be connected to the negative terminal of the direct current power supply, and since the mid-tap point is always connected to the positive terminal, a current of a given polarity will be induced in the secondary winding 242 and applied to load 243. Thereafter, in order to turn off the gate controlled rectifier 245, the commutating gate controlled rectifier 248 is turned on. The charge built up on capacitor 249, in the meantime, is allowed to discharge through the load current carrying rectifier 245 to cause it to be commutated off. Concurrently, the remaining load current carrying gate controlled rectifier 246 is turned on so that conduction then occurs through the remaining half of the primary winding 244 thereby inducing a current of opposite polarity in the secondary winding 242 which is supplied to the load device 243. The circuit of FIGURE 11 has a particular advantage of not requiring a center-tapped direct current power supply and utilizes only four gate controlled rectifiers. Otherwise, the advantages of the circuit are much the same as those outlined in connection with the circuit of FIGURE 7; namely, that the load current need not be supplied through a commutating inductance; hence losses in the circuit are reduced to a minimum.

Figure 12:
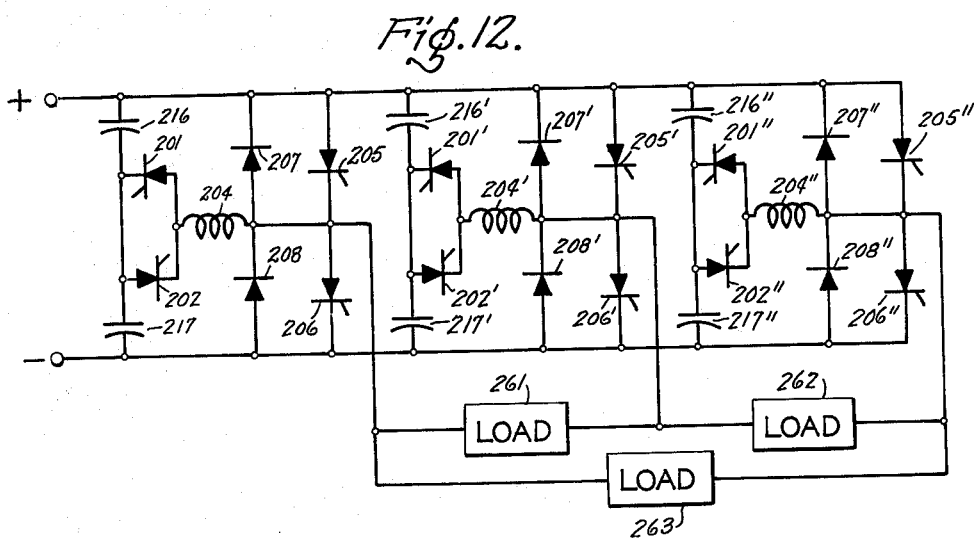
FIGURE 12 is a three-phase inverter constructed in accordance with the invention which employs the back-to-back reverse polarity parallel connected gate controlled commutating rectifiers.

A three-phase inverter circuit constructed along the lines of the circuit of FIGURE 8 is illustrated in FIGURE 12 of the drawings. The three-phase inverter of FIGURE 12 employs three separate single-phase inverter circuits identical in construction and operation to the single-phase inverter described with relation to FIGURE 8 of the drawings. The load element 261 is connected between the juncture of two load current carrying gate controlled rectifiers 205 and 206, and the juncture of the two load current carrying gate controlled rectifiers 205' and 206'. A second load element 262 is interconnected between the juncture of two load current carrying gate controlled rectifiers 205' and 206', and the juncture of the two load current carrying gate controlled rectifiers 205" and 206". Finally, the three-phase load is completed by a remaining load element 263 that is interconnected between the juncture of the two load current carrying gate controlled rectifiers 205" and 206", and the juncture of the two load current carrying gate controlled rectifiers 205 and 206. In operation, a gating signal source (not shown) is connected to the gate electrodes of each of the gate controlled rectifiers in the three-phase inverter circuit to gate on each of these rectifiers in a predetermined time sequence whereby load current will be supplied through each of the load elements 261, 262, and 263. During the commutation periods, the commutating gate controlled rectifiers 201, 202, 201', 202', 201", and 202" will function in the manner described with relation to FIGURE 8 of the drawings to commutate off proper ones of the load current carrying gate controlled rectifiers.

From the foregoing description, it can be appreciated that the invention makes available a new and improved family of inverter circuits which are built from solid-state gate controlled rectifiers, and which are capable of operation over a wide range of frequencies. By incorporating into these circuits gate controlled rectifiers and other components having the desired power carrying capabilities, it is possible to make them available for use over a wide range of power outputs. Further, because of the design of the circuits, they are highly efficient in operation and possess good regulation in that they minimize distortion in the square output wave shapes produced by the circuits. All of these advantages are derived from the fact that the inverter circuits constructed in accordance with the invention do not require that load currents flow through any commutating inductance. Hence, increased efficiency and better voltage regulation is obtained from the inverter than those heretofore available in the art. Additionally, in one family of inverters made possible by the invention, the commutation energy is recirculated thereby requiring that only minimal amounts of electricity be drawn from the power supply source to achieve commutation, making further improvements in efficiency of the circuit possible. Because of these advantages, it is possible to use the circuits at much higher frequencies.

Having described several embodiments of the new and improved inverter circuits constructed in accordance with the invention, it is believed obvious that other modifications and variations of the invention are possible in light of the above teachings. It is, therefore, to be understood that changes may be made in the particular embodiments of the invention described which are within the full intended scope of the invention as defined by the appended claims.

What I claim as new and desire to secure by Letters Patent of the United States is:

1. An inverter circuit including in combination at least two sets of two series connected gate controlled rectifiers connected in parallel circuit relationship across a source of direct current electric power, a capacitor and a single inductor directly connected in series circuit relationship through a low impedance path at the commutating frequency between the junction of the two gate controlled rectifiers in each set, a diode rectifier connected in parallel circuit relationship across respective ones of at least one of said sets of gate controlled rectifiers in reverse polarity with respect to said gate controlled rectifiers, and a load operatively connected through said last mentioned gate controlled rectifiers to said source of electric power.

2. The combination set forth in claim 1 further characterized by a source of gating signals operatively connected to the gating electrodes of respective ones of said gate controlled recifiers for turning on said rectifiers in a predetermined sequence.

3. The combination set forth in claim 1 wherein there are there such inverter circuits connected in parallel circuit relationship across said direct current source with the load devices being connected between the junctures of respective pairs of the sets of gate controlled rectifiers which are connected in parallel with diode rectifiers.

4. An inverter circuit for use in conjunction with a direct current electric power supply including in combination a single inductor and a capacitor connected in series circuit relationship, at least two load current carrying gate controlled rectifiers for connecting a load device to respective alternate terminals of said direct current supply, a single commutating gate controlled rectifier for each of said load current carrying gate controlled rectifiers connected in series circuit relationship through a low impedance path with said series connected capacitor and inductor, and connected through a low impedance path to respective ones of said load current carrying rectifiers for supplying a reverse polarity potential across the associated load current carrying rectifier during commutating intervals, and a diode rectifier connected directly across each of said load current gate controlled rectifiers in reverse polarity parallel circuit relationship.

5. An inverter circuit including in combination first and second sets of two series connected gate controlled rectifiers connected in parallel circuit relationship through a low impedance path across a source of direct current electric power, a capacitor and a single inductor connected in series circuit relationship through a low impedance path between the junction of the two gate controlled rectifiers in each set, a diode rectifier connected in parallel circuit relationship across respective ones of the first set of gate controlled rectifiers in reverse polarity with respect to said first gate controlled rectifiers and with the juncture of the diode rectifiers being connected to one end of said series circuit in common with the juncture of the first gate controlled rectifiers, and a source of gating signals operatively coupled to the gating electrodes of said first and second sets of gate controlled rectifiers for gating on the first gate controlled rectifier in the first set, then the corresponding gate controlled rectifier in the second set, the remaining gate controlled rectifier on the first set, and then the corresponding gate controlled rectifier on the second set in one cycle of operation.

6. The combination set forth in claim 5 wherein the source of electric power is connected across said first and second sets of gate controlled rectifiers with the load being connected between a mid-tap point on the power supply and the juncture of the first set of gate controlled rectifiers.

7. The combination set forth in claim 5 wherein there are two such inverter circuits connected in parallel circuit relationship across a direct current source of electric power with the load being connected between the juncture of the first set of gate controlled rectifiers of one inverter circuit and the juncture of the first set of gate controlled rectifiers in the remaining inverter circuit.

8. An inverter circuit including in combination first and second pairs of parallel connected gate controlled rectifiers, a capacitor and a single inductor connected in series circuit relationship, a low impedance path serving to connect said series circuit in series circuit relationship with said parallel connected pairs of gate controlled rectifiers, a holding-off gate controlled rectifier interconnecting the gate controller rectifiers of each pair, a source of direct current electric energy, and an output transformer having a load device connected to the secondary winding, the primary winding of said transformer having a center-tap connection to one terminal of the direct current electric energy source and having the two ends thereof connected through respective ones of said pairs of parallel connected gate controlled rectifiers to the remaining terminal of the electric energy source, and commutating diodes connected in parallel with each pair of said gate controlled rectifiers and a source of gating signals operatively connected to the gating electrodes of respective ones of said gate controlled rectifiers for gating said rectifiers on in a predetermined sequence.

9. The combination set forth in claim 8 further characterized by a source of gating signals for gating on one of the gate controlled rectifiers in the first pair, then gating on the corresponding gate controlled rectifier in the second pair together with the holding gate controlled rectifier of the first pair, gating on the remaining gate controlled rectifier in the second pair, and then gating on the remaining gate controlled rectifier in the first pair together with the holding gate controlled rectifier of the second pair.

10. An inverter circuit including in combination a source of direct current electric energy, first and second sets of two series connected load current carrying gate controlled rectifiers connected across said source of direct current electric energy, first and second sets of two series connected first commutating gate controlled rectifiers connected in parallel through a low impedance path with said load current carrying gate controlled rectifiers across said direct current source of electric energy, a load device connected between the junctures of the series connected rectifiers of said first and second sets of load current carrying rectifiers, a capacitor and a single inductor connected through a low impedance path in series circuti relationship between the junctures of the series connected rectifiers of said first and second sets of first commutating gate controlled rectifiers, and a set of four second commutating gate controlled rectifiers connected between the juncture of the first load current carrying rectifiers and the junctures of the first and second sets of first commutating rectifiers, respectively, and between the juncture of the second load current carrying rectifiers and the junctures of the first and second sets of first commutating rectifiers, respectively, and a source of gating pulses operatively coupled to the gating electrodes of said gate controlled rectifiers for gating on said rectifiers in a predetermined sequence.

11. An inverter circuit for use in conjunction with a direct current electric power supply including in combination a single inductor and a capacitor connected in series circuit relationship, at least two load current carrying gate controlled rectifiers for connecting a load device to respective terminals of said direct current supply, and a single commutating gate controlled rectifier for each of said load current carrying gate controlled rectifiers directly connected through a low impedance path at the commutating frequency in series circuit relationship with said series connected capacitor and inductor and to respective ones of said load current carrying rectifiers for supplying a reverse polarity potential across said load current carrying rectifiers during commutating intervals, and feedback diode means connected across each of said load current carrying gate controlled rectifiers in reverse polarity parallel circuit relationship.

12. The combination set forth in claim 11 further characterized by a source of gating signals for gating on one of the load current carrying gate controlled rectifiers, then gating on a commutating gate controlled rectifier, gating on the remaining load current carrying gate controlled rectifier, and then gating on the remaining commutating gate controlled rectifier in one cycle of operation of the inverter.

13. An inverter circuit including in combination a pair of commutating gate controlled rectifiers connected in reverse polarity parallel circuit relationship, a capacitor and a single inductor connected in series circuit relationship with said parallel connected commutating rectifiers, a pair of load current carrying gate controlled rectifiers for operatively coupling a load device across the terminals of a direct current power supply, the series circuit comprised by said parallel connected commutating rectifiers and the inductor and capacitor being connected in a closed series circuit loop relationship with respective ones of the load current carrying rectifiers for applying a reverse polarity potential across the load current carrying rectifiers during commutating intervals, and feedback diode means connected across each of said load current carrying gate controlled rectifiers in reverse polarity parallel circuit relationship.

14. An inverter circuit including in combination a pair of gate controlled load current carrying rectifiers connected in series circuit relationship across a source of direct current electric energy, a respective commutating diode connected in reverse polarity parallel circuit relationship across each load current carrying rectifier, a pair of commutating gate controlled rectifiers connected in parallel reverse polarity relationship, a capacitor and a single inductor connected in series circuit with said pair of parallel connected commutating rectifiers between a mid-tap point on the direct current source and the common juncture of the load current carrying rectifiers and their respective commutating diodes, the series circuit comprised by the reverse polarity parallel connected rectifiers, and capacitor and inductor being adapted to have a load device connected thereacross.

15. An inverter circuit including in combination a pair of gate controlled rectifiers connected in series circuit relationship across a source of direct current electric energy, a respective commutating diodes connected in reverse polarity parallel circuit relationship across each load current carrying rectifier, a pair of capacitors connected in series circuit relationship across the direct current source, a pair of commutating gate controlled rectifiers connected in parallel reverse polarity relationship and a single inductor connected in series circuit relationship with said pair of commutating gate controlled rectifiers between the juncture of the series connected capacitors and the common juncture of the load current carrying gate controlled rectifiers and the commutating diodes, said common juncture being also adapted to have a load device connected between a mid-tap point on the direct current source and the common juncture.

16. The combination set forth in claim 15 wherein there are three such inverter circuits connected across a direct current supply and wherein three load devices are interconnected between the junctures of the load current carrying gate controlled rectifiers.

17. An inverter circuit including in combination at least two sets of two series connected load current carrying gate controlled rectifiers connected in parallel circuit relationship across a source of direct current electric power, a pair of commutating gate controlled rectifiers connected in reverse polarity parallel circuit relationship, a capacitor and a single inductor connected in series circuit relationship with said parallel connected commutating rectifiers between the junctions of the two load current carrying gate controlled rectifiers in each set, said circuit being adapted to have a load device connected across the series circuit thus formed, and a diode rectifier connected in parallel circuit relationship across respective ones of said sets of load current carrying gate controlled rectifiers in reverse polarity with respect to said gate controlled rectifiers.

18. An inverter circuit including in combination first and second sets of two series connected load current carrying gate controlled rectifiers connected in parallel circuit relationship across a source of direct current electric power, means for connecting a load device between the junctures of the load current carrying rectifiers in each set, a diode rectifier connected in parallel circuit relationship across respective ones of the load current carrying gate controlled rectifiers in reverse polarity with respect to said load current carrying rectifiers and the juncture of the diode rectifiers being connected in common with the juncture of the load current carrying rectifiers, a set of two series connected capacitors connected in parallel circuit relationship with each of said first and second sets of load current carrying rectifiers across said power supply, a pair of reverse polarity parallel connected commutating gate controlled rectifiers connected in series circuit with a single inductor between the juncture of the capacitors of each set and the juncture of the associated load current carrying rectifiers, and a source of gating signals operatively coupled to the gating electrodes of said first and second sets of gate controlled rectifiers for gating on the first gate controlled rectifier in the first set, then the corresponding gate controlled rectifier in the second set, the remaining gate controlled rectifier on the first set, and then the corresponding gate controlled rectifier on the second set.

19. An inverter circuit including in combination a transformer adapted to have a load device connected across the secondary winding thereof, the primary winding of said transformer having the mid-tap point thereof connected to one terminal of a direct current power supply, a pair of load current carrying gate controlled rectifiers connecting the respective ends of the primary windings to the remaining terminal of the direct current power supply, a pair of reverse polarity parallel connected commutating gate controlled rectifiers connected in series circuit relationship with a single inductor and a capacitor between the junctures of the ends of the primary winding and the load current carrying gate controlled rectifiers, and a commutating diode connected in reverse polarity relationship across each of said load current carrying gate controlled rectifiers.

References Cited by the Examiner

UNITED STATES PATENTS 3,074,008  1/63  McPhail _____ 323—66
3,120,633  2/64  Genuit _____ 321—18 X

OTHER REFERENCES

Contolled Rectifier Manual, publication by Semiconductor Products Department of the General Electric Company (March 1960), pages 71–73, 142 and 143.

Electronics, May 27, 1960, pages 114–117.

LLOYD McCOLLUM, *Primary Examiner.*

SAMUEL BERNSTEIN, *Examiner.*